(12) United States Patent
Letsinger

(10) Patent No.: US 7,322,043 B2
(45) Date of Patent: Jan. 22, 2008

(54) ALLOWING AN ELECTRONIC DEVICE ACCESSING A SERVICE TO BE AUTHENTICATED

(75) Inventor: Reed Letsinger, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 611 days.

(21) Appl. No.: 10/175,619

(22) Filed: Jun. 20, 2002

(65) Prior Publication Data

US 2003/0236991 A1 Dec. 25, 2003

(51) Int. Cl.
*G06F 7/04* (2006.01)
*G06F 7/24* (2006.01)

(52) U.S. Cl. .............. 726/19; 726/9; 726/17; 726/18; 726/19; 726/20

(58) Field of Classification Search .......... 726/9, 726/20, 17, 18, 19
See application file for complete search history.

(56) References Cited

U.S. PATENT DOCUMENTS

| | | | | |
|---|---|---|---|---|
| 5,077,790 A | * | 12/1991 | D'Amico et al. ........... 380/249 |
| 5,745,677 A | * | 4/1998 | Grube et al. .................. 726/5 |
| 5,781,724 A | * | 7/1998 | Nevarez et al. .............. 726/17 |
| 6,985,946 B1 | * | 1/2006 | Vasandani et al. .......... 709/225 |
| 7,137,003 B2 | * | 11/2006 | Krishnan et al. ........... 713/172 |
| 2001/0055988 A1 | * | 12/2001 | Blake et al. ................ 455/575 |
| 2002/0029216 A1 | * | 3/2002 | Tzou ......................... 707/100 |
| 2002/0098834 A1 | * | 7/2002 | Yuen ......................... 455/420 |
| 2002/0170960 A1 | * | 11/2002 | Ehrensvard et al. ........ 235/380 |
| 2003/0031321 A1 | * | 2/2003 | Mages ........................ 380/270 |
| 2003/0079127 A1 | * | 4/2003 | Bidan et al. ................ 713/172 |
| 2003/0105832 A1 | * | 6/2003 | Kaneko ...................... 709/217 |
| 2005/0197115 A1 | * | 9/2005 | Clark et al. ............. 455/426.1 |
| 2006/0143188 A1 | * | 6/2006 | Bright et al. ................. 707/10 |

* cited by examiner

*Primary Examiner*—Nasser Moazzami
*Assistant Examiner*—Eleni A Shiferaw

(57) ABSTRACT

A method for allowing an electronic device accessing a service to be authenticated. A communications device is loaded with a first identifier. To gain access to the service, the communications device transmits the first identifier to an authentication device which contains a second identifier. In response to receiving the first identifier from the communications device, the authentication device provides the communications device with the second identifier. The communications device forwards the second identifier to the service to authenticate the user in order to gain access to that service.

18 Claims, 8 Drawing Sheets

ALLOWING AN ELECTRONIC DEVICE ACCESSING A SERVICE TO BE AUTHENTICATED

FIELD OF THE INVENTION

The present invention pertains to a method and apparatus for allowing an electronic device accessing a service to be authenticated.

BACKGROUND OF THE INVENTION

Electronic communications have become ingrained with the way companies and individuals transact, communicate, and otherwise handle much of their day-to-day activities and functions. For example, cell phones have become integral to the way by which people communicate. Furthermore, with the proliferation of networks and the Internet, all types of digital data is being transmitted electronically. Much of the data being transmitted either wirelessly, over a network, or via the Internet contains sensitive information. For example, an e-commerce transaction virtually always entails the transmission of confidential personal data. It is now commonplace to conduct banking, brokerage, as well as other types of financial transactions electronically between individuals and those businesses offering such services. And with the proliferation of mobile communications devices, such as notebook computers, laptops, personal digital assistants, specialized hand-held communications tools, tablets, terminals, and all sorts of Internet-enabled appliances, the amount data containing information of a confidential, personal, or otherwise sensitive nature that is being transmitted electronically is rapidly increasing.

Due to the sensitive and highly confidential nature of many electronic transactions, these transmissions need to be safeguarded. One way of protecting the data is to encrypt the data being sent. However, encrypting sensitive data merely serves to protect the data from being intercepted and compromised. Encryption does not address the problem of authenticating the user or sender. For instance, if an individual wishes to purchase stocks, the on-line brokerage must verify that the person placing the order is actually an authorized client. There must be some mechanism to verify and ensure that the sender is actually whom they are purportedly representing themselves to be. Otherwise, unauthorized third parties can masquerade as the true user and cause great harm. These unauthorized parties can gain access to restricted data (e.g., bank account numbers, credit card numbers, personal logs, proprietary documents, e-mail accounts, etc.).

One way to verify the identity of an individual entails the use of passwords. In theory, a password is assigned to an individual or selected by that individual. This password is unique and known only by that person. The person must enter his or her password in order to prove that they are indeed the person whom is purportedly being represented. The service or business verifies the password to authenticate that the received electronic transmission is indeed legitimate.

Unfortunately, passwords suffer from several major problems. First, a person may forget his or her password. Often, a person must remember several different passwords, one for each different service or subscription. This makes it even harder for people to remember the correct passwords. In order to more easily remember their passwords, individuals frequently choose passwords which may have some relevance (e.g., names, birthdays, commonly used words, etc.). Consequently, many passwords are easily broken, which defeats the purpose of implementing passwords in the first place. Furthermore, people may share their passwords with colleagues, friends, spouses, associates, etc. In turn, these individuals might innocently or maliciously disclose the password to others. In any case, a password can rapidly lose its efficacy.

Furthermore, individuals are often required to enter their passwords in order for them to be granted access. This can be inconvenient, especially if the user is prompted to enter their password quite frequently. Otherwise, if a user is only required to log in once, they may subsequently forget to log out or may temporarily step away. The open session then becomes highly susceptible to being misused.

In light of the shortcomings associated with passwords, some manufacturers have resorted to encoding their products with unique ID's or other identification mechanisms. A specific product has an identifier which is hardwired or permanently assigned to that particular product. Basically, the product automatically authenticates itself with the ID when prompted. This removes the responsibility of the user from having to remember and enter in a password. As such, it eliminates some of the problems associated with passwords. Unfortunately, products may be lost, stolen, hijacked, or temporarily misappropriated. In which case, anyone in possession of the product can masquerade as the legitimate owner, and the data or service becomes severely compromised, sometimes without the true owner even becoming aware of the security breach.

Therefore, there are numerous disadvantages and risks associated with prior art mechanisms and methods for authenticating electronic transmissions used to access remote services.

SUMMARY OF THE INVENTION

A method for allowing an electronic device accessing a service to be authenticated is disclosed. A communications device is loaded with a first identifier. To gain access to the service, the communications device transmits the first identifier to an authentication device which contains a second identifier. In response to receiving the first identifier from the communications device, the authentication device provides the communications device with the second identifier. The communications device forwards the second identifier to the service to authenticate the user in order to gain access to that service.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

A method and apparatus for authenticating electronic transmissions used to access a service is now described in detail. In the following detailed description, numerous specific details are set forth in order to provide a thorough understanding of the present invention. However, it should be noted that the present invention may be practiced by ones skilled in the art without these specific details or with equivalents thereof.

In one embodiment, an authentication device is initially loaded with a Device ID and a User ID. The Device ID is transmitted by the authentication device to a communications device. When a user desires to use the communications device to access an electronic service, a User ID must be provided in order to authenticate that user to the service. This is accomplished as follows. The communications device first transmits its Device ID back to the authentication device. The authentication device verifies that it is the correct Device ID. Upon verification, the authentication device transmits the User ID to the communications device. The communications device can now forward the User ID to the electronic service. This User ID serves to authenticate that the user is indeed authorized.

The user gains access to the electronic service as long as the authentication device continues to provide the User ID to the communications device. If the user happens to lose the communications device or happens to physically be separated from the communications device, access to the service is automatically severed. Access is denied because the communications device no longer is within range of receiving the User ID from the authentication device. Thereby, the user is protected by unauthorized access to his or her electronic service providers. This scheme is convenient to the user because it does not require that the user remember and enter password(s). Besides being transparent to the user, it is also quite effective because it automatically safeguards access in case the user loses the communications device or if the user temporarily steps away from the communications device.

Figure 1A:
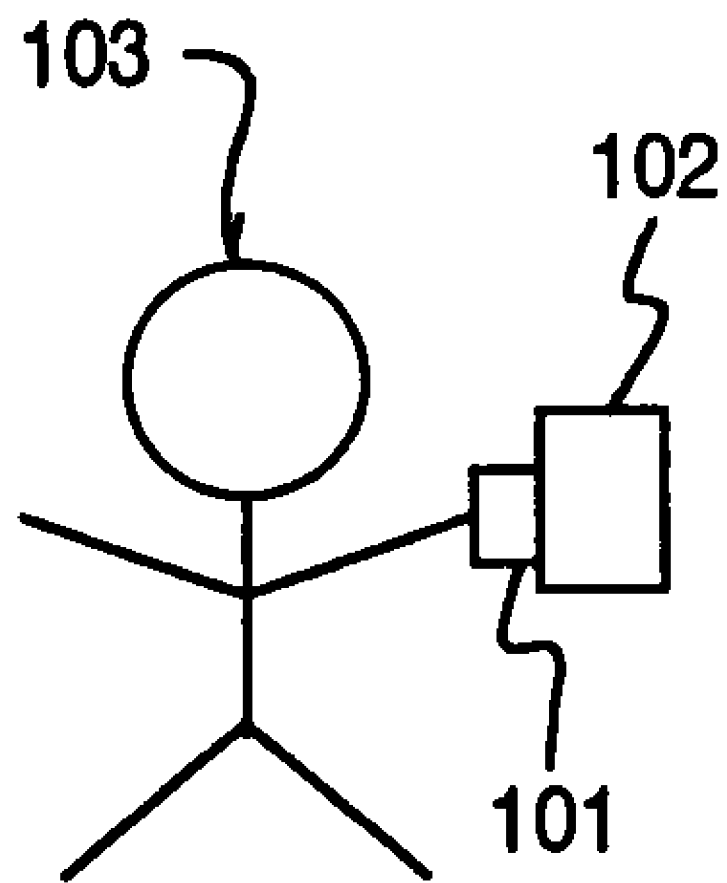
FIG. 1A shows a user loading a communications device with a Device ID provided by an authentication device.
Figure 1B:
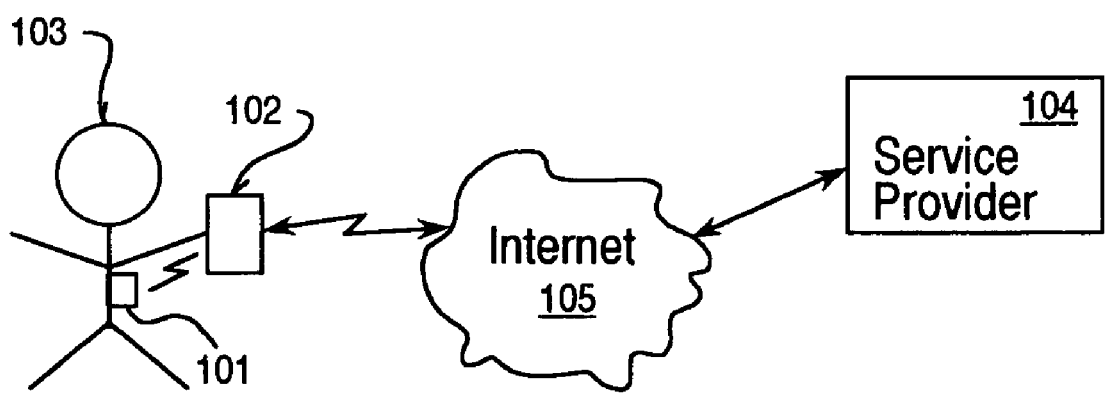
FIG. 1B shows the authentication of a user in order to gain access to a service.
Figure 1C:
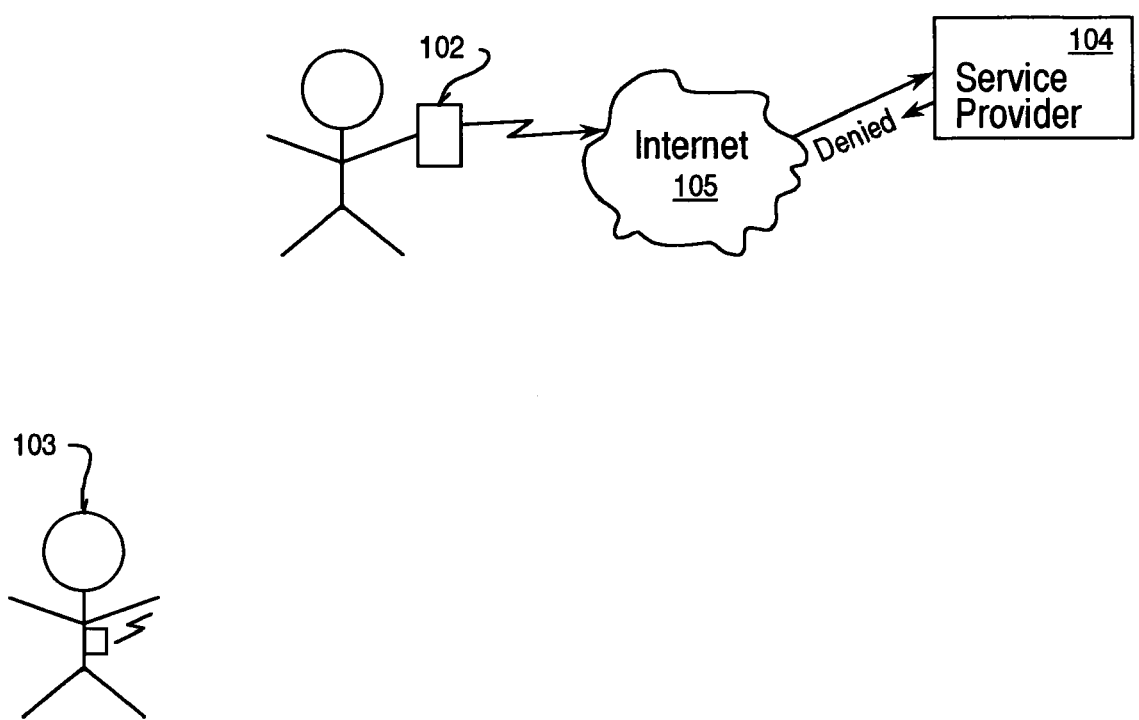
FIG. 1C shows how access is denied to unauthorized parties.

FIGS. 1A-C demonstrate one way by which the present invention may be practiced. In FIG. 1A, the Device ID and User ID is initially stored in the authentication device, such as a badge 101. The user 103 loads a communications device, such as a personal digital assistant (PDA) 102 with the Device ID. The PDA 102 must first be loaded with the correct Device ID before it can gain access to any sensitive personal information retained by a service provider. FIG. 1B shows how the user 103 gains access to his or her service provider 104. First, the PDA 102 transmits its Device ID to the badge 101. If the Device ID is correct, badge 101 transmits the User ID back to the PDA 102. Thereupon, PDA 102 forwards the UserID to the service provider 104 over the Internet 105. The service provider 104 grants access to the user's personal information upon verifying the User ID. Service provider 104 continues to grant access to user 103 so long as the badge 101 supplies the PDA 102 with the User ID. Thereby, user 103 transparently accesses service provider 104 via Internet 105 with minimal effort and overhead.

However, if the user 103 ever loses or is temporarily away from PDA 102, access to service provider 104 immediately halts. This is due to the fact that PDA 102 is beyond the range of badge 101. Consequently, PDA 102 no longer receives the User ID. Without the User ID, the service provider 104 denies access. Therefore, an unauthorized agent 106 is prevented from gaining access to service provider 104.

Figure 2:
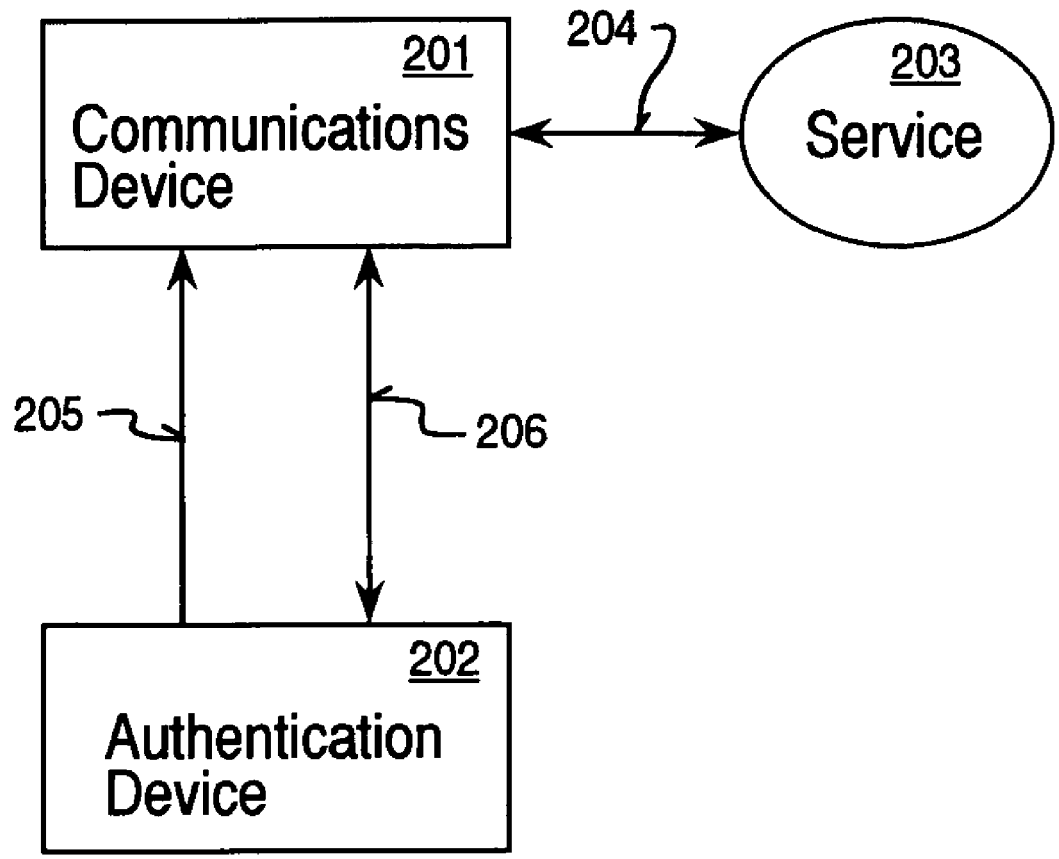
FIG. 2 shows a block diagram depicting the interactions between a communications device, an authentication device, and a service according to one embodiment of the present invention.

Referring to FIG. 2, a block diagram depicting the interactions between a communications device 201, an authentication device 202, and a service 203 is shown according to one embodiment of the present invention. Basically, a user interacts with communications device 201 to perform one or more functions with a service 203 via an electronic transmission. The user is authenticated by means of authentication device 202 in concert with communications device 201. For example, a user can enter a stock transaction order by placing the order on his or her personal computer (communications device 201). The electronic brokerage (service 203) authenticates the user before executing the order. The authentication is performed according to identification codes (supplied by authentication device 202).

More specifically, communications device 201 can be any device used by one or more individuals to interact with a service 203. Communications device 201 can communicate with service 203 over path 204 by means of a direct wired connection, over the telephone lines, as packets routed over a network, via the Internet, or wirelessly (e.g., microwave, satellite, IEEE 802.11, cellular, radio wave, etc.). Communications device 201 can be a portable device or a stationary device which is shared by multiple users. Some examples of communications device 201 include, but are not limited to, automatic teller machines, personal computers, lap top computers, personal digital assistants, cellular telephones, security access points, terminals, tablets, kiosks, Internet stations, mobile electronic appliances, consumer electronics, business applications, etc.

Service 203 can be any type of service which can be transacted through electronic transmissions between a remote user and that service. For example, the service may be a news service, an electronic brokerage, a web site, e-business, travel agency, real estate office, banking institution, medical unit, call center, etc. Alternatively, service 203 can serve as a gateway through which a user must first gain access in order to execute any commands or retrieve confidential or personal information corresponding to that particular account. Before responding to a user, the service 203 requests that the user be authenticated.

Authentication device 202 acts in concert with communications device 201 to authenticate the electronic transmissions between the communications device 201 and service 203. The authentication device 202 is physically separate from that of communications device 201. In one embodiment, the authentication device 202 is a small, lightweight, unobtrusive piece of electronics which is kept with the user virtually all the time or at least most of the time. This can be accomplished by embedding the authentication device 202 within the user as part of a tiny microchip just under the surface of the skin or semi-permanently bonded on top of the skin. The authentication device 202 can be worn as part of a piece of clothing, jewelry, or watch. Alternatively, the authentication device 202 can be fixedly attached as part of a personal item, such as a wallet, credit card, ID card, driver's license, employee badge, ATM card, etc. And because the authentication device 202 is embedded, worn, or integrated as part of a personal item, the user will have the authentication device with him or her at all or most times. This will greatly reduce the chances of loss, theft, or being misappropriated.

In one embodiment, the authentication device 202 stores two identification codes. The authentication device 202 contains a Device ID and a User ID. There is no need imposed on the user to know, remember, or enter either of these two identification codes. During an initialization phase, the communications device 201 is loaded with the Device ID by the authentication device 202. The authentication device 202 automatically supplies the Device ID to communications device 201 over communications channel 205. Communications channel 205 is specifically designed so that the authentication device 202 must either be physically touching or placed in very close proximity (e.g., a few inches or centimeters) to communications device 201 in order for successful transfer of the Device ID. One significance for the close proximity restriction is to ensure that the proper Device ID is loaded. In other words, the close proximity guarantees that the Device ID is supplied by the proper authentication device 202 (rather than another nearby authentication device, an interfering signal, or some spurious signal). Moreover, the close proximity restriction helps prevent others from intercepting the sensitive Device ID. Absent the correct authentication device 202, the communications device 201 cannot be properly initialized.

Now, when a user desires to access service 203, proper authentication is achieved as follows. First, the service 203 requests that the communications device 201 provide a proper User ID. The communications device 201 transmits its initialized Device ID to authentication device 202 over communications channel 206. The authentication device 202 compares the Device ID received from communications device 201 against its internally stored Device ID. Only if there is a match does authentication device 202 transmit the User ID to communications device 201. In other words, the authentication device 202 verifies whether the Device ID is legitimate. This User ID is then forwarded by the communications device 201 to the service 203 as part of the user's electronic transmission. The service 203 verifies the User ID to authenticate that the user is legitimate before granting access. If the User ID is incorrect, the service denies access.

In one embodiment, communications channel 206 is specifically designed to have a limited effective range (e.g., approximately several feet or one meter). The effective range is carefully selected to correspond to the user's "personal space." The personal space is that area surrounding the user which is within his or her immediate physical control. As long as the communications device is within the range of communications channel 206, the User ID will continue to be provided by authentication device 202 and forwarded to service 203; service 203 will correspondingly continue granting access. However, if the communications device 201 is moved past this range, it no longer receives the User ID from authentication device 202. Consequently, service 203 immediately denies access. Thereby, if the communications device 201 were to ever leave the personal space of the user (e.g., if the communications device were lost, stolen, or borrowed), access to service 203 would be suspended indefinitely.

Figure 3:
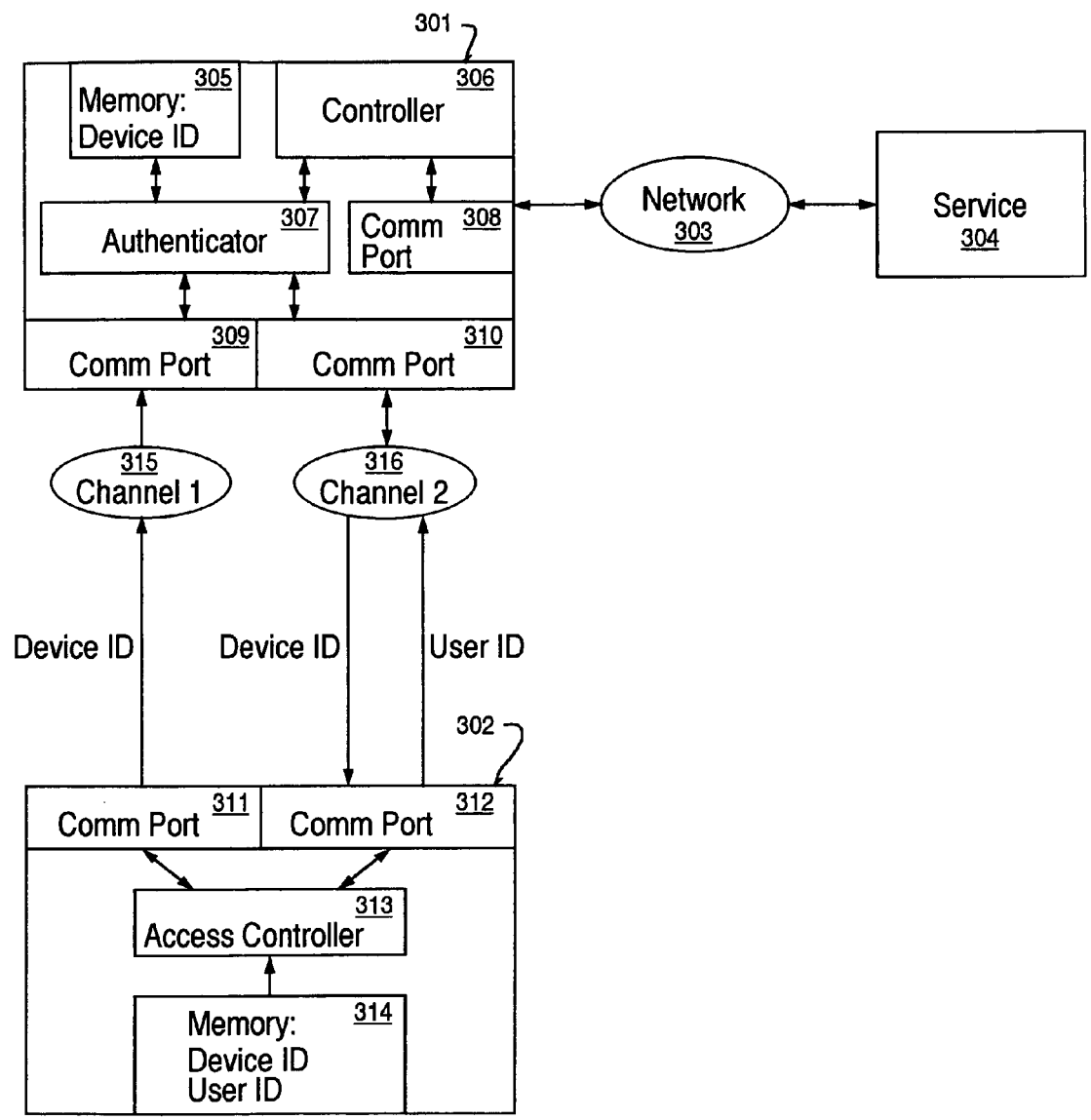
FIG. 3 is a flowchart describing the steps for initializing and authenticating identification information corresponding to electronic transmissions according to one embodiment of the present invention.

FIG. 3 is a detailed diagram depicting the internal parts of the communications device and the authentication device as well as the communications channels in accordance with one embodiment of the present invention. The communications device is shown as device 301. It is the device which is to be authenticated with the service 304. The communications device 301 can be a mobile device (e.g., a PDA, cell phone, laptop computer, etc.) or a stationary device shared by multiple users (e.g., automatic teller machine, kiosk, etc.). The authentication device is represented as device 302. It is a portable device that is worn by the user, or otherwise kept close to the user's body most of the time. The authentication device 302 may be a smart watch worn on the wrist, a smart card carried in a wallet, smart jewelry (e.g., a necklace), or a chip embedded under or on the surface of the skin. The communications device 301 communicates with the service 304 by means of a network 303. Network 303 can be any communications network electronically coupling the communications device 301 with the service 304. It may be wired or wireless; it may be the Internet or a local, metro, or wide area network.

In one embodiment, the communications device 301 communicates with the authentication device 302 over two channels. Channel one 315 is a communication channel that requires the sender and the receiver of information to be physically touching, or to be within a few inches of each other. One example of an implementation of channel one would be the use of RFID beacons and readers. Channel two 316 is a secure communication channel that requires the sender and receiver of information to be within approximately one meter of each other. Line-of-sight is not required. Since the authentication device 302 is on the user's body, the communications device 301 should be within arm's length of the user's body in order to communicate with the authentication device 302. A volume of approximately one meter form the user's person is his or her "personal space." One implementation of Channel two is a short-range radio frequency protocol, such as Bluetooth or 802.11(b).

The communications device 301 is comprised of a memory 305, controller 306, authenticator 307, and three communication ports 308, 309, and 310. Memory 305 is a non-volatile memory (e.g., read-only memory, programmable ROM, FLASH memory, etc.) which is capable of storing a Device ID. The Device ID is a numeric or alphanumeric sequence or code which uniquely identifies a device associated with the authentication device 302. The controller 306 is any hardware, firmware, and/or software that performs three functions: it determines when information is sent to the service 304; it determines what information is sent to the service 304; and it determines when information sent to the service 304 needs user authentication. Authenticator 307 communicates with both the memory 305 and controller 306. The authenticator 307 can be hardware, firmware, and/or software residing within communications device 301. It transfers a Device ID from the communications port 309 to be stored in memory 305. This occurs whenever the communications device 301 is brought within close enough range of the authentication device 302 to activate channel one 315. And whenever the controller 306 requests a User ID, the authentication software retrieves the Device ID from memory 305 and sends it to the communications port 310 for transmission to the communications port 312 of authentication device 302 via channel two 316. In one embodiment, channel two 316 is a secure, encrypted channel. Subsequently, when a User ID is received from the authentication device 302 over channel two 316 and is made available to communication port 310, the authentication software sends that User ID to the controller 306. In turn, the controller 306 forwards the User ID to the network 303 and service 304 by means of communication port 308. Communication port 308 can be hardware, firmware, and/or software that enables the communications device 301 to transmit and receive data over the network 303. It may be a network card.

The authentication device 302 is comprised of communication port 311, communication port 312, access controller 313, and memory 314. Communication port 311 can be hardware, firmware, and/or software that enables the authentication device 302 to send the Device ID to the communication device 301 via channel one 315. It can be an RFID sender. Likewise, communication port 312 can be hardware, firmware, and/or software. Port 312 enables two-way communications between the authentication device 302 and communications device 301 via channel two 316. Specifically, port 312 receives a Device ID and transmits a User ID. The access controller 313 is hardware or software that serves two functions. First, it provides the Device ID stored in nonvolatile memory 314 to communication port 311 for transmission over channel one 315. Second, it compares a Device ID received by communication port 312 with the Device ID stored in memory 314. If the two Device ID's match, the access controller 313 provides the User ID stored in memory 314 to communication port 312 for transmission over channel two 316 to communications device 301. Memory 314 is non-volatile memory used to store a single Device ID and a single User ID. The User ID can be a random or pseudo-random numeric or alpha-numeric sequence which corresponds to a specific user account.

In the embodiment described above, the communications device is initialized with a first Device ID. It retains this first Device ID until it is subsequently re-initialized with a different Device ID by a different authentication device. Since the communications device can only retain one Device ID at any given time, the more recent Device ID overwrites the older Device ID.

However, in an alternative embodiment, a timer is included within the communications device. After a predetermined amount of time has elapsed since the last time the communications device had communicated with the authentication device, the Device ID is automatically erased from the memory of the communications device. In this alternative embodiment, an added level of security is achieved because the communications device would necessarily be required to be re-initialized every time it is removed from the user's personal space after a sufficient period of time has elapsed. Referring back to FIG. 3, this alternative embodiment can be achieved by including a clock circuit in communications device 301. The authenticator 307 pings the authentication device 302 at regular intervals. If connection with the authentication device 302 is broken, the authenticator 307 starts the clock. After the clock times out, the authenticator 307 erases the Device ID from memory 305.

Figure 4:
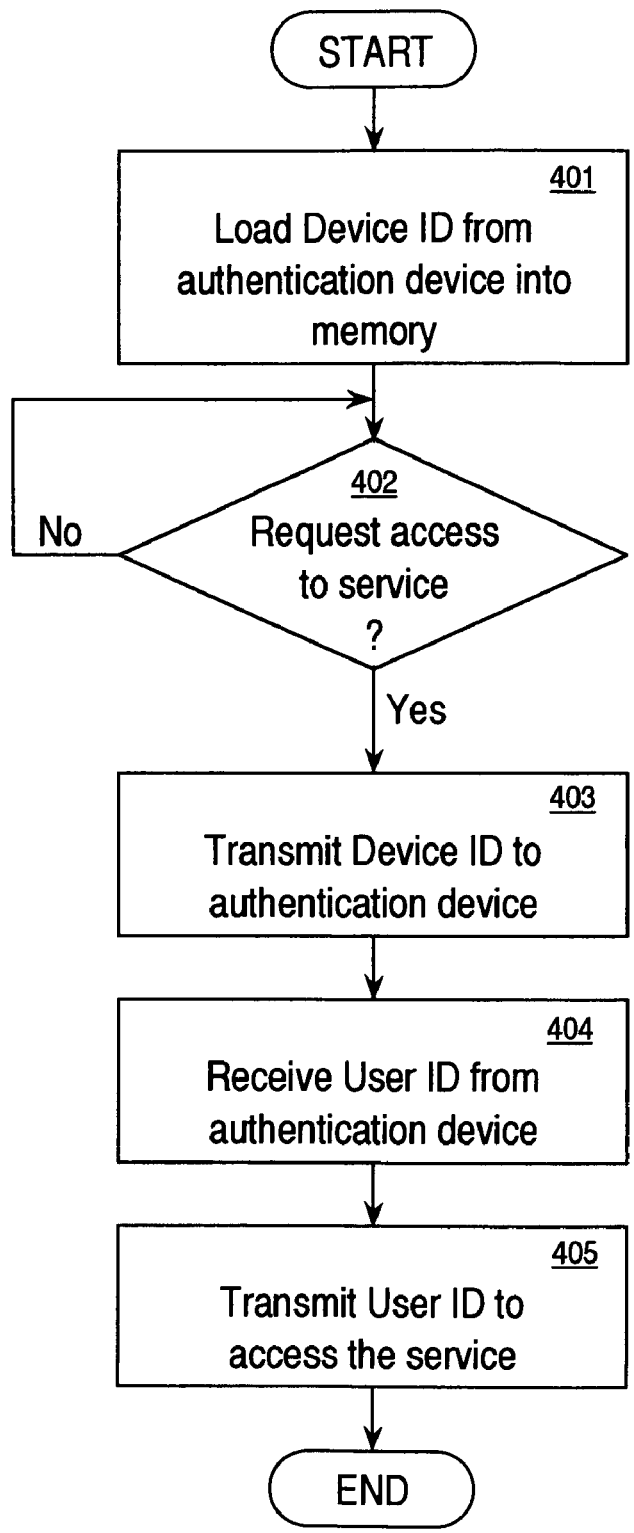
FIG. 4 is a flowchart describing the steps corresponding to a communications device in accordance with one embodiment of the present invention.

FIG. 4 is a flowchart describing the steps corresponding to a communications device in accordance with one embodiment of the present invention. Initially, the communications device is loaded with the Device ID supplied by an authentication device in step 401. In step 402, the communications device waits for the user to request access to a service provider. When the user desires to access the service provider, the communications device transmits the Device ID to the authentication device in step 403. In response, the authentication device returns a User ID which is received by the communications device in step 404. The communications device can then forward this User ID to the authenticate the user to the service provider in step 405.

Figure 5:
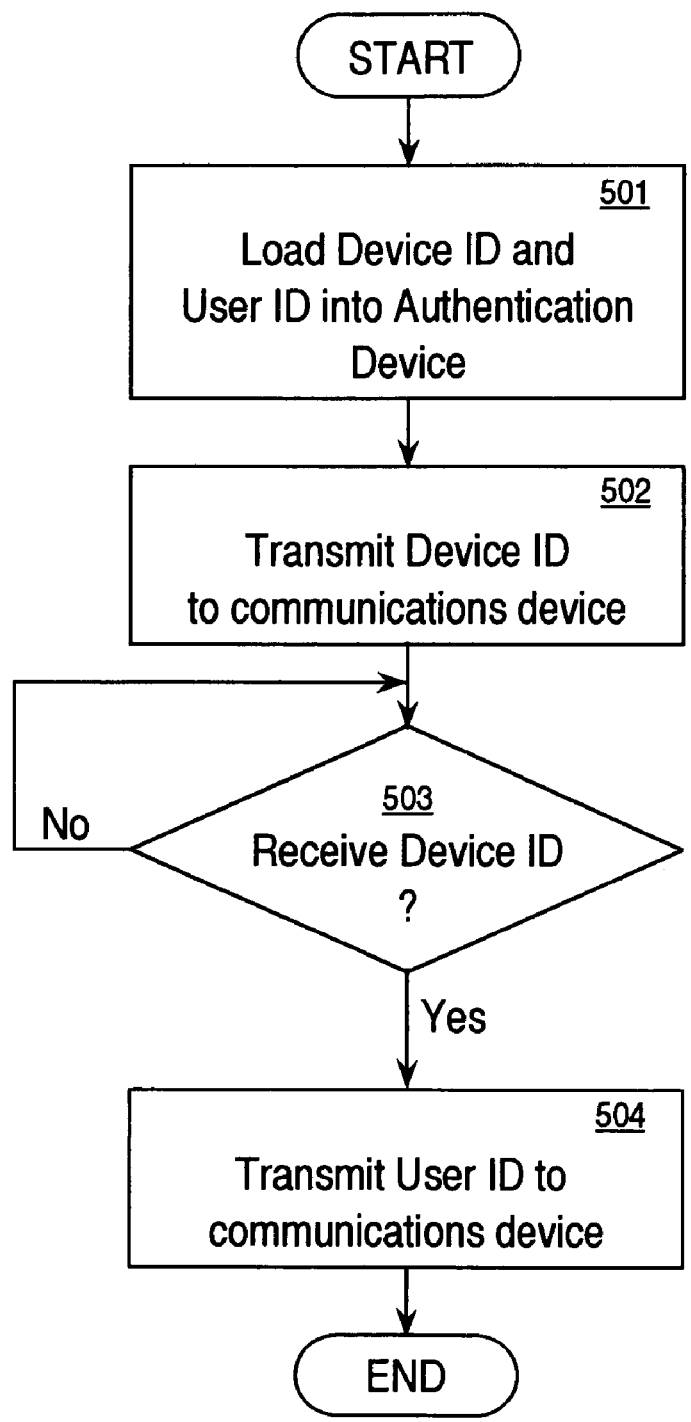
FIG. 5 is a flowchart describing the steps corresponding to an authentication device in accordance with one embodiment of the present invention.

FIG. 5 is a flowchart describing the steps corresponding to an authentication device in accordance with one embodiment of the present invention. The authentication device is initially loaded with a Device ID and a User ID in step 501. Subsequently, the Device ID is transmitted to a communications device in step 502. The authentication device then waits for receipt of a Device ID from the communications device in step 503. When a Device ID is received, the authentication device verifies the received Device ID and then transmits the User ID to the communications device in step 504.

Figure 6:
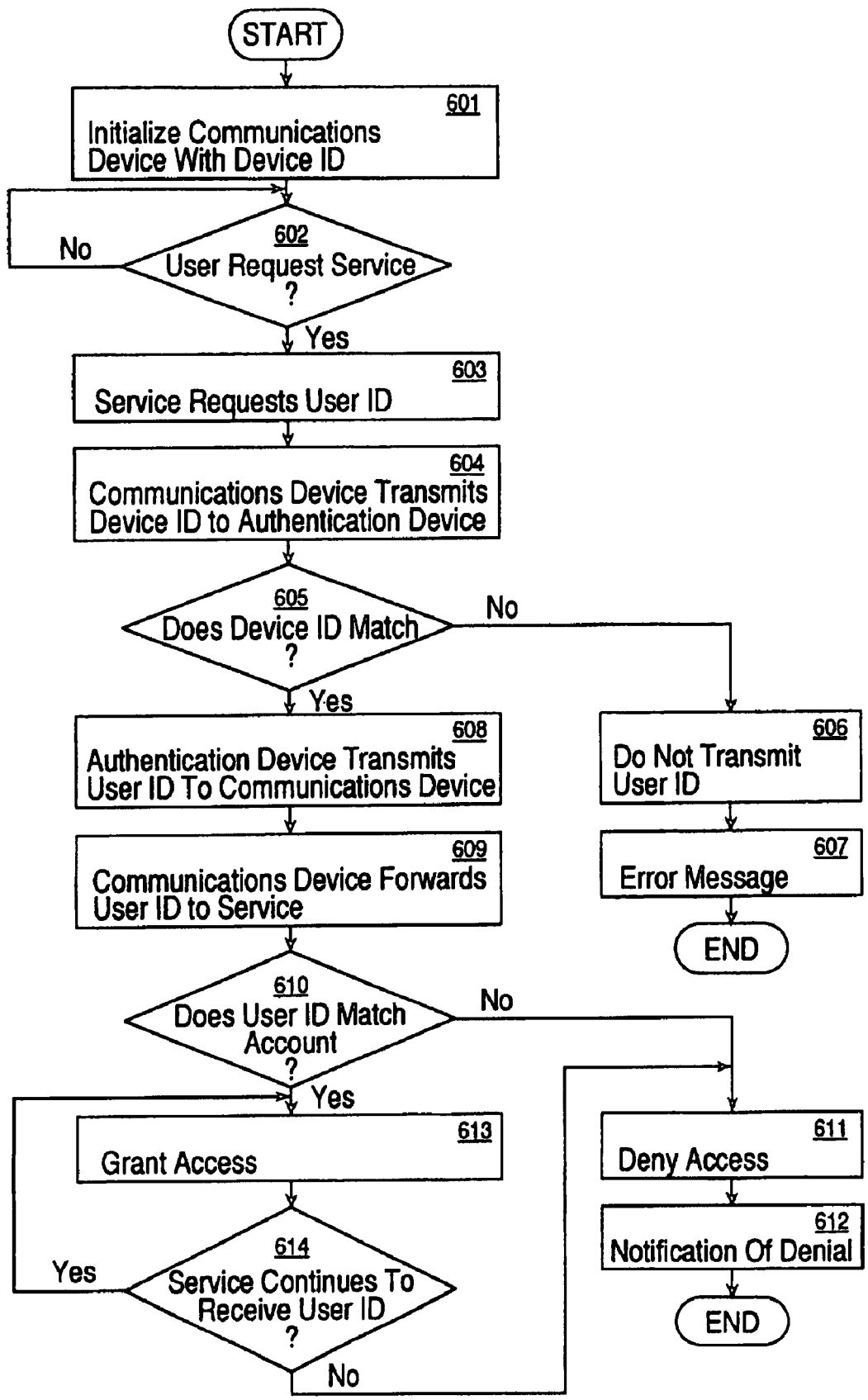
FIG. 6 is a detailed diagram depicting the internal parts of the communications device and the authentication device as well as the communications channels in accordance with one embodiment of the present invention.

FIG. 6 is a flowchart describing the steps for initializing and authenticating identification information corresponding to electronic transmissions according to one embodiment of the present invention. Initially, the communications device is loaded with a unique Device ID, step 601. The authentication device transmits the Device ID to the communications device. In one embodiment, the transmission of the Device ID from the authentication device to the communications device is handled by a channel which requires actual physical contact or extremely close proximity between the two devices. This Device ID is stored in non-volatile memory within the communications device. The communications device can only store one Device ID at any given time. It retains the most recent Device ID. The communications device waits until a user desires to access a service, step 602. When a user requests access to a service, the service requests that a proper User ID be provided in order to authenticate that the user is legitimate, step 603. In response, the communications device transmits the Device ID stored internally to the authentication device, step 604. The authentication device compares the received Device ID against its internally stored Device ID, step 605. If the two Device ID's do not match, then the authentication device does not transmit a User ID, step 606. The authentication device can optionally notify the user of the denied access or generate an error message, step 607.

Otherwise, if the two Device ID's match, then the authentication device transmits the User ID to the communications device, step 608. The communications device forwards the User ID to the service, step 609. Upon receipt of the User ID, the service determines whether the User ID corresponds to that of the account which access is being requested, step 610. If the User ID does not match that previously designated for that account, then the service denies access, step 611. Optionally, a notification of the denial of service or some type of error message can be generated for display to the user, step 612. Otherwise, if the User ID matches that of the account, this indicates that user is authentic; and the service grants access, step 613. The service continuously requests that the communications devices provide the User ID so long as the user desires access, step 614.

If the communications device continues to provide the User ID, then the service continues to grant access, step 613. However, if the service no longer receives the proper User ID, it immediately denies access, step 611. In one embodiment, a separate communications channel exists for handling the transmission of the Device ID from the communications device to the authentication device (step 604) and for the transmission of the User ID from the authentication device to the communications device (step 608). This separate communications channel is intentionally designed to have a limited range. The range corresponds to the range that is under the user's physical control and/or awareness. Thereby, if the communications device ever leaves the immediate vicinity of the user, access to the service is immediately halted.

Therefore, the preferred embodiment of the present invention, a method and apparatus for authenticating electronic transmissions, is thus described. While the present invention has been described in particular embodiments, it should be appreciated that the present invention should not be construed as limited by such embodiments, but rather construed according to the below claims.

What is claimed is:

1. A method for allowing an electronic device accessing a service to be authenticated, comprising:

loading a communications device with a first identifier from an authorization device, wherein the authorization device was previously loaded with the first identifier and wherein the communications device is the electronic device;

the communication device requesting said service using a second identifier, wherein the second identifier is a user identifier;

transmitting the first identifier from the communications device to the authentication device;

receiving the second identifier at the communications device from the authentication device in response to the authentication device authenticating the first identifier;

transmitting the second identifier to the service to gain access to the service; and placing said authentication device in physical contact with said communications device to load said first identifier into said communications device.

2. The method of claim 1 further comprising:

accessing said service only so long as said communications device remains within range of said authentication device.

3. The method of claim 2, wherein said range corresponds to an area which is within immediate control of a user of said communications device.

4. The method of claim 1, wherein only one first identifier can be stored at a time within said communications device.

5. The method of claim 1 further comprising:

initiating a timer when said communications device is moved beyond said range of said authentication device;

erasing said first identifier from said communications device when said timer expires.

6. The method of claim 1, wherein said communications device comprises a mobile device.

7. The method of claim 1, wherein said communications device comprises a fixed device which is shared by a plurality of users.

8. An apparatus for accessing a remote service, comprising:

a first interface for accepting a first identifier sent by an authentication device over a first channel, wherein said authentication device was loaded with said first identifier prior to said first interface accepting said first identifier;

a memory coupled to said first interface which stores said first identifier;

a second interface coupled to said memory, wherein said second interface transmits said first identifier to said authentication device over a second channel and said second interface also receiving a second identifier from said authenticator in response to transmission of said first identifier;

a third interface coupled to said second interface which forwards said second identifier to a network, wherein said transmission of said second interface is used to gain access to said remote service, wherein the service requested the second identifier from the apparatus and wherein the second identifier is a user identifier;

a controller coupled to said third interface, wherein said controller determines when data is to be sent over said network, what data is to be sent over said network, and when data sent over said network needs user authentication; and an authenticator coupled to said controller, wherein said authenticator transfers said first identifier from said first interface to said memory when said apparatus is placed within close enough proximity to said authenticating device to activate said first channel.

9. The apparatus of claim 8, wherein in response to a request from said service, said authenticator reads said first identifier from said memory and sends said first identifier to said first interface.

10. The apparatus of claim 8, wherein said third interface continues to forward said second identifier to said network only so long as said second channel remains active.

11. The apparatus of claim 8 further comprising a timer which causes said first identifier to be deleted from said memory after a pre-determined amount of time has elapsed from when said communications device is moved beyond a range of said second channel.

12. A method for providing authentication information used to authenticate electronic transmissions, comprising:

storing a first identifier and a second identifier in memory associated with an authentication device;

transmitting said first identifier from said authentication device to a communications device over a first channel when said first channel is activated;

receiving at said authentication device said first identifier transmitted by said communications device;

comparing said first identifier transmitted by said communications device to said first identifier stored in said memory;

transmitting said second identifier from said authentication device to said communications device only if said first identifier transmitted by said communications device matches said first identifier stored in said memory, wherein said second identifier is a user identifier and transmitted to said communications device over a second channel; and placing said authentication device in physical contact with said communications device to load said first identifier into said communications device.

13. The method of claim 12 further comprising embedding said authentication device which performs said storing, transmitting, receiving, and comparing in a personal item of an owner of said communications device.

14. An authentication device which provides a first unique identifier and a second unique identifier used to authenticate electronic transmissions for accessing a remote service, comprising:

a memory which stores said first unique identifier and said second unique identifier;

a first interface coupled to said memory, wherein said first interface transmits said first unique identifier to a communications device over a first channel when said authentication device and said communications device is within range of said first channel;

a second interface coupled to said memory, wherein said second interface receives said first unique identifier from said communications device;

a controller coupled to said second interface, wherein said controller determines whether said first unique identifier from said communications device matches said first unique identifier stored in said memory and said controller provides said second unique identifier for transmission by said second interface only if said first unique identifier from said communications device matches said first unique identifier stored in said memory, wherein said second unique identifier is a user identifier;

transmitting said second unique identifier to said remote server to gain access to a service; and wherein said first interface requires physical contact with said communications device to be within range of said first channel.

15. The authentication device of claim 14, wherein a maximum range of said first channel is approximately two inches.

16. The authentication device of claim 14, wherein a maximum range of said second channel is approximately one meter.

17. The authentication device of claim 14 further comprising means for attaching said authentication device to a personal item belonging to a user of said communications device.

18. The authentication device of claim 14, wherein said authentication device is designed to be embedded in a person.

\* \* \* \* \*